(12) United States Patent
van Hassel et al.

(10) Patent No.: US 11,724,967 B2
(45) Date of Patent: Aug. 15, 2023

(54) SYSTEM AND METHOD FOR FORMING AN ULTRA-HIGH TEMPERATURE COMPOSITE STRUCTURE

(71) Applicant: United Technologies Corporation, Farmington, CT (US)

(72) Inventors: Bart A. van Hassel, Weatogue, CT (US); Sergei F. Burlatsky, West Hartford, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 935 days.

(21) Appl. No.: 16/440,456

(22) Filed: Jun. 13, 2019

(65) Prior Publication Data

US 2020/0392048 A1 Dec. 17, 2020

(51) Int. Cl.
  *C04B 35/80* (2006.01)
  *C04B 35/622* (2006.01)
  *C04B 35/628* (2006.01)
  *C04B 35/64* (2006.01)
  *D01D 5/00* (2006.01)

(52) U.S. Cl.
  CPC ........ *C04B 35/80* (2013.01); *C04B 35/62227* (2013.01); *C04B 35/62844* (2013.01); *C04B 35/62884* (2013.01); *C04B 35/62894* (2013.01); *C04B 35/64* (2013.01); *D01D 5/0007* (2013.01); *C04B 2235/5256* (2013.01)

(58) Field of Classification Search
  CPC .................. C04B 35/80; C04B 35/62227
  See application file for complete search history.

(56) References Cited

U.S. PATENT DOCUMENTS

| | | | |
|---|---|---|---|
| 2005/0192622 A1* | 9/2005 | Bowlin | A61M 25/09 606/200 |
| 2009/0253328 A1* | 10/2009 | Watanabe | D01F 1/10 264/464 |
| 2014/0358217 A1 | 12/2014 | Stankus | |
| 2015/0224739 A1* | 8/2015 | Joo | B32B 5/12 428/113 |
| 2016/0102023 A1* | 4/2016 | La Forest | C23C 16/045 428/155 |
| 2016/0243808 A1 | 8/2016 | Schmidt | |
| 2017/0203484 A1 | 7/2017 | Grigoryev et al. | |
| 2019/0123321 A1 | 4/2019 | Joo | |

OTHER PUBLICATIONS

EP search report for EP20178335.4 dated Oct. 9, 2020.
Teo et al. "A review on electrospinning design and nanofibre assemblies", Nanotechnology 17, 2006, p. R89-R106.
(Continued)

*Primary Examiner* — Robert A Vetere
(74) *Attorney, Agent, or Firm* — Getz Balich LLC (57) ABSTRACT

A method for forming an ultra-high temperature (UHT) composite structure includes dispensing a first polymeric precursor with a spinneret; forming a first plurality of nanofibers from the first polymeric precursor; depositing the first plurality of nanofibers with a collector; and applying a fluid, with a nozzle, onto the first plurality of nanofibers disposed on the collector. The fluid includes a second polymeric precursor.

14 Claims, 3 Drawing Sheets

(56) References Cited

OTHER PUBLICATIONS

Azarnoush et al. "Additive Manufacturing of SiCN Ceramic Matrix for SiC Fiber Composites by Flash Pyrolysis of Nanoscale Polymer Films", J. Am. Cern, Soc, 99 (6), 2016, pp. 1855-1858.
Huang et al. "A review on polymer nanofibers by electrospinning and their applications in nanocomposites", Composites Science and Technology 63, 2003, pp. 2223-2253.
Rahmani et al. "Statistical Analysis of Nanofibers Alignment in Magnetic-Field-Assisted Electrospinning Including an Alignment Percentage Formula", Journal of Applied Polymer Science, Jun. 16, 2014.
Tao et al. "Synthesis and Characterization of a Boron-Containing Precursor for ZrB2 Ceramic", Journal of Ceramic Science and Technology 07, 2006, pp. 107-112.
Soldate et al. "Controlled Deposition of Electrospun Nanofibers by Electrohydrodynamic Deflection", Journal of Applied Physics 125, 2019.
Gevorkyan et al. "Rapid Thermal Processing of Electrospun PbZr0.52Ti0.48O3 Nanofibers", Thermochimica Acta 605, 2015, pp. 107-114.

\* cited by examiner

SYSTEM AND METHOD FOR FORMING AN ULTRA-HIGH TEMPERATURE COMPOSITE STRUCTURE

BACKGROUND

1. Technical Field

This disclosure relates generally to systems and methods for forming ultra-high temperature (UHT) ceramic matrix composite (CMC) structures, and more particularly to electrospinning and electrospraying systems and methods for forming ultra-high temperature (UHT) ceramic matrix composite (CMC) structures.

2. Background Information

Hypersonic vehicles and reusable space systems may require materials which can withstand extreme conditions (e.g., high temperatures and pressures) for a relatively short period of time. Jet engines may also require such materials for turbine blades, nozzles, high-pressure turbine shrouds, combustor inner and/or outer liners, and other engine components which can be subject to extreme conditions for a relatively long period of time. Ceramic matrix composites can withstand higher temperatures than metals and, therefore, require less cooling than conventional materials from which aerospace components are manufactured. However, manufacturing composite components capable of withstanding said extreme conditions is difficult. For example, conventional manufacturing methods may be unable to obtain sufficient density of the composite material. Accordingly, improved systems and methods for manufacturing composite structures suitable for extreme conditions are necessary.

SUMMARY

According to an embodiment of the present disclosure, a system for forming an ultra-high temperature (UHT) composite structure includes an electrospinning apparatus, a collector, and an electrospraying apparatus. The electrospinning apparatus includes a spinneret disposed at a first end of a flowpath and biased at a first DC voltage. The spinneret is configured to dispense a first polymeric precursor into the flowpath forming a plurality of nanofibers from the first polymeric precursor. The collector is disposed at a second end of the flowpath and spaced from the spinneret along the flowpath. The collector is biased at a second DC voltage different than the first DC voltage and configured to receive the plurality of nanofibers. The electrospraying apparatus includes a nozzle biased at a third DC voltage different than the second DC voltage. The nozzle is configured to apply a fluid including a second polymeric precursor onto the plurality of nanofibers deposited on the collector.

In the alternative or additionally thereto, in the foregoing embodiment, the nozzle is configured to move relative to the collector.

In the alternative or additionally thereto, in the foregoing embodiment, the second polymeric precursor is different than the first polymeric precursor.

In the alternative or additionally thereto, in the foregoing embodiment, the system further includes a rapid thermal processing assembly.

In the alternative or additionally thereto, in the foregoing embodiment, the rapid thermal processing assembly includes at least one of a laser, an electron beam, or a flash pyrolysis assembly.

In the alternative or additionally thereto, in the foregoing embodiment, the spinneret and the collector are configured to move relative to one another.

In the alternative or additionally thereto, in the foregoing embodiment, the first polymeric precursor has a greater viscosity than the second polymeric precursor.

According to another embodiment of the present disclosure, a method for forming an ultra-high temperature (UHT) composite structure includes dispensing a first polymeric precursor with a spinneret; forming a first plurality of nanofibers from the first polymeric precursor; depositing the first plurality of nanofibers on the collector; and applying a fluid, with a nozzle, onto the first plurality of nanofibers disposed on the collector. The fluid includes a second polymeric precursor.

In the alternative or additionally thereto, in the foregoing embodiment, the first plurality of nanofibers and the fluid define a two-dimensional layer.

In the alternative or additionally thereto, in the foregoing embodiment, the method further includes forming a second plurality of nanofibers from the first polymeric precursor and depositing the second plurality of nanofibers on the collector. The second plurality of nanofibers is disposed on the two-dimensional layer.

In the alternative or additionally thereto, in the foregoing embodiment, forming and depositing the second plurality of nanofibers occurs subsequent to applying the fluid onto the first plurality of nanofibers.

In the alternative or additionally thereto, in the foregoing embodiment, the method further includes pyrolyzing the two-dimensional layer.

In the alternative or additionally thereto, in the foregoing embodiment, the method further includes carbothermally or borothermally reducing the two-dimensional layer.

In the alternative or additionally thereto, in the foregoing embodiment, the method further includes pyrolyzing the two-dimensional layer with a rapid thermal processing assembly.

In the alternative or additionally thereto, in the foregoing embodiment, the method further includes moving the nozzle relative to the collector.

According to another embodiment of the present disclosure, a method for forming an ultra-high temperature (UHT) composite structure includes dispensing a first polymeric precursor with a spinneret; forming a first two-dimensional layer by forming a first plurality of nanofibers from the first polymeric precursor, depositing the first plurality of nanofibers on a collector, and applying a fluid, with a nozzle, onto the first plurality of nanofibers disposed on the collector, the fluid comprising a second polymeric precursor; pyrolyzing the first two-dimensional layer; at least one of carbothermally or borothermally reducing the first two-dimensional layer; and forming a second two-dimensional layer by forming a second plurality of nanofibers from the first polymeric precursor, depositing the second plurality of nanofibers on the first two-dimensional layer, and applying the fluid onto the second plurality of nanofibers.

In the alternative or additionally thereto, ultra-high temperature (UHT) composite structure is a graded structure.

In the alternative or additionally thereto, in the foregoing embodiment, depositing the fluid includes forming a gas from the fluid with the nozzle.

In the alternative or additionally thereto, in the foregoing embodiment, depositing the fluid includes a chemical vapor depositing process.

In the alternative or additionally thereto, in the foregoing embodiment, the method further includes infiltrating the first two-dimensional layer with a matrix material.

The present disclosure, and all its aspects, embodiments and advantages associated therewith will become more readily apparent in view of the detailed description provided below, including the accompanying drawings.

DETAILED DESCRIPTION

It is noted that various connections are set forth between elements in the following description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Figure 1:
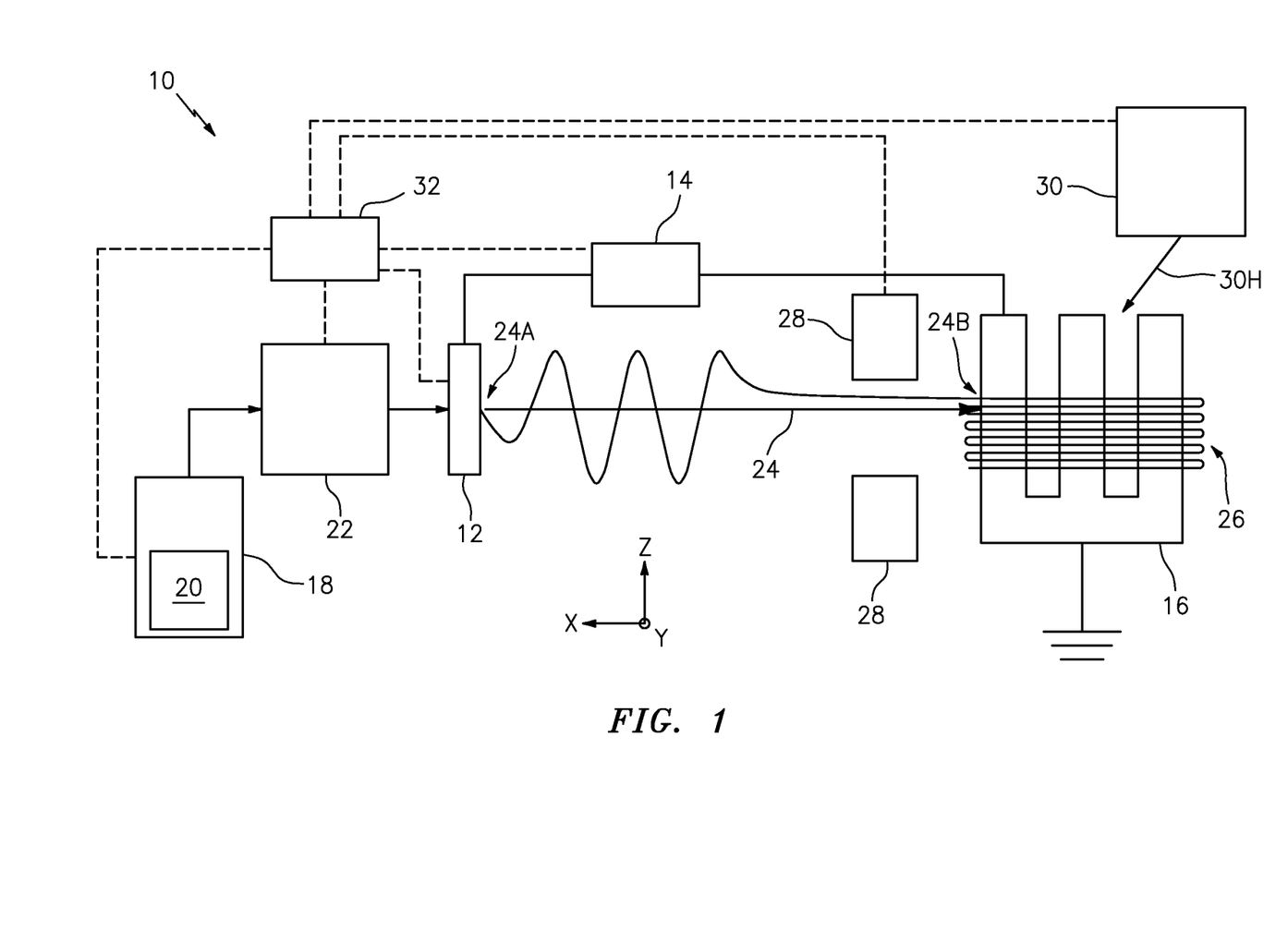
FIG. 1 illustrates an exemplary embodiment of an electrospinning apparatus.

Referring to FIG. 1, an electrospinning apparatus 10 for forming a three-dimensional ceramic-matrix composite structure, according to at least one embodiment of the present disclosure, is generally illustrated. In some embodiments, the composite structure may include an ultra-high temperature ceramic (UHT) material. The electrospinning apparatus 10 generally includes at least one spinneret 12 in electrical communication with a power source 14 and a grounded collector 16 spaced from the at least one spinneret 12.

The at least one spinneret 12 is in fluid communication with a reservoir 18 containing a polymeric precursor 20. In some embodiments, a pump 22 may be provided in fluid communication between the at least one spinneret 12 and the reservoir 18 to convey the polymeric precursor 20 from the reservoir 18 to the at least one spinneret 12. Various configurations of the at least one spinneret 12 may be used depending on the type of electrospinning (e.g., melt, solution, or wire electrospinning). For example, in some embodiments, the at least one spinneret 12 can include a single syringe needle, a multi-syringe needle, an extrusion die, or porous media. In some other embodiments, the at least one spinneret 12 may include various shapes upon which the polymeric precursor 20 may form a film, for example, a cone-like, edge-like, wire, cylinder, knife edge, or spiral coil shape. The power source 14 applies a direct current (DC) voltage to the at least one spinneret 12 thereby biasing the at least one spinneret 12 at a first DC voltage (e.g., a positive or negative DC voltage). The at least one spinneret 12 is disposed at a first end 24A of a polymeric precursor flowpath 24 while the collector 16 is disposed at an opposing second end 24B of the flowpath 24. The at least one spinneret 12 is configured to dispense (i.e., extrude) the polymeric precursor 20 into the flowpath 24 extending between the at least one spinneret 12 and the collector 16. In some embodiments, the collector 16 and the at least one spinneret 12 may be configured to move relative to one another. For example, the at least one spinneret 12 may be configured to move in one or more of an x-, a y-, or a z-direction. For further example, the collector may be configured to move in one or more of the x-, the y-, or the z-direction, and/or rotate and/or tilt about an axis.

As noted above, the collector 16 is grounded, thereby biasing the collector 16 at a second DC voltage, different than the first DC voltage of the at least one spinneret 12. The collector 16 is configured to receive the polymeric precursor 20 dispensed by the at least one spinneret 12. The first DC voltage of the at least one spinneret 12 and the second DC voltage of the collector 16 create an electrical potential between the at least one spinneret 12 and the collector 16. As a result of the electrical potential, the polymeric precursor 20 becomes charged causing the polymeric precursor 20 to repel from the at least one spinneret 12 into the flowpath 24, thereby forming a conical shape commonly referred to as a "Taylor Cone." As the polymeric precursor 20 moves along the flowpath 24 between the at least one spinneret 12 and the collector 16, the polymeric precursor 20 begins to elongate and whip randomly (see, e.g., FIG. 1) forming a plurality of "green" nanofibers 26 which are received by (i.e., deposited on) the collector 16. As used herein, the term "green" refers to the condition of nanofibers 26 prior to a pyrolysis step. In some embodiments, the fibers disclosed herein (e.g., the plurality of nanofibers 26) may have a diameter of 100 nanometers (nm) to 25 micrometers (μm). In some other embodiments, the fibers disclosed herein may have a diameter of 100 nm to 1 μm. It should be noted that the term "nanofibers" will be used to refer to fibers herein without regard to the diameter of the fibers.

The plurality of nanofibers 26 are deposited on the collector 16 layer by layer to form a three-dimensional green nanofiber structure. As used herein, the term "three-dimensional" is used to convey that the plurality of nanofibers 26 are deposited in multiple layers, for example, on the collector 16. The term "two-dimensional" may be used to refer to a single layer of plurality of nanofibers 26. In some embodiments, the plurality of nanofibers 26, for example, may define a layer wherein a majority of the nanofibers of the layer are in contact with a preceding base layer. For example, a first layer of the plurality of nanofibers 26 may include a first portion of the plurality of nanofibers 26 wherein a majority of the nanofibers of the first portion are in contact with the collector 16. For further example, a second layer of the plurality of nanofibers 26 may include a second portion of the plurality of nanofibers 26 wherein a majority of the nanofibers of the second portion are in contact with the first layer of the plurality of nanofibers 26. In some embodiments, less than a majority of the nanofibers of a layer may be in contact with the preceding base layer. A thickness of a layer may be any suitable thickness for forming a composite structure. Further, a layer of nanofibers used to form a composite structure may have a thickness which is different than another layer of nanofibers used to form the composite structure.

In some embodiments, alignment of the plurality of nanofibers 26 during deposition on the collector 16 may be desirable to reduce the porosity of the three-dimensional green structure thereby increasing the density of the final composite structure. Alignment between plurality of nanofibers 26 may be quantified, for example, by evaluating scanning electron microscopy (SEM) images of the nanofiber microstructure to determine an alignment percentage. See, e.g., Rahmani et al., *Statistical Analysis of Nanofibers Alignment in Magnetic-Field-Assisted Electrospinning Including an Alignment Percentage Formula*, J. Appl. Polym. Sci., DOI: 10.1002/APP.41179 (2014) (incorporated herein by reference).

In some embodiments, the electrospinning apparatus 10 may include a plurality of magnets 28 disposed about and radially spaced from the flowpath 24 between the at least one spinneret 12 and the collector 16. In some embodiments, the plurality of magnets 28 may be circumferentially spaced from one another about the flowpath 24. The plurality of magnets 28 form a first magnetic field which extends into the flowpath 24. Whipping of the plurality of nanofibers 26 as they move between the at least one spinneret 12 and the collector 16 generates a second magnetic field in the plurality of nanofibers 26 which interacts with the first magnetic field. Interaction between the first and second magnetic fields may change a direction of movement of the plurality of nanofibers 26 along the flowpath 24. Accordingly, the plurality of magnets 28 may be configured to adjust the first magnetic field so as to control the direction of movement of the plurality of nanofibers 26 along the flowpath 24 between the at least one spinneret 12 and the collector 16, thereby improving alignment, and hence density, of the plurality of nanofibers 26 deposited on the collector 16. The plurality of magnets 28 may include electromagnets, permanent magnets, or any other suitable magnet for providing the first magnetic field. In some embodiments, the plurality of magnets 28 may be moved relative to the flowpath 24 in order to control the direction of movement of the plurality of nanofibers 26 along the flowpath 24. A length of the flowpath 24 from the at least one spinneret 12 to the collector 16 may affect the alignment of the nanofibers 26 on the collector 16. For example, a relatively shorter length of the flowpath 24 may result in nanofibers 26 have a relatively larger diameter, however, a reduction in the whipping action of the nanofibers 26 may result in improved alignment of the nanofibers 26 and, subsequently, increased density of the three-dimensional composite structure. In some embodiments, a fiber alignment percentage of the plurality of nanofibers 26 in the range of 50% to 100% may be achieved. In some other embodiments, a fiber alignment percentage of the plurality of nanofibers 26 in the range of 70% to 100% may be achieved. Perfectly aligned and ordered nanofibers may achieve a maximum density of about 78.5% to about 90.7%.

Figure 2:
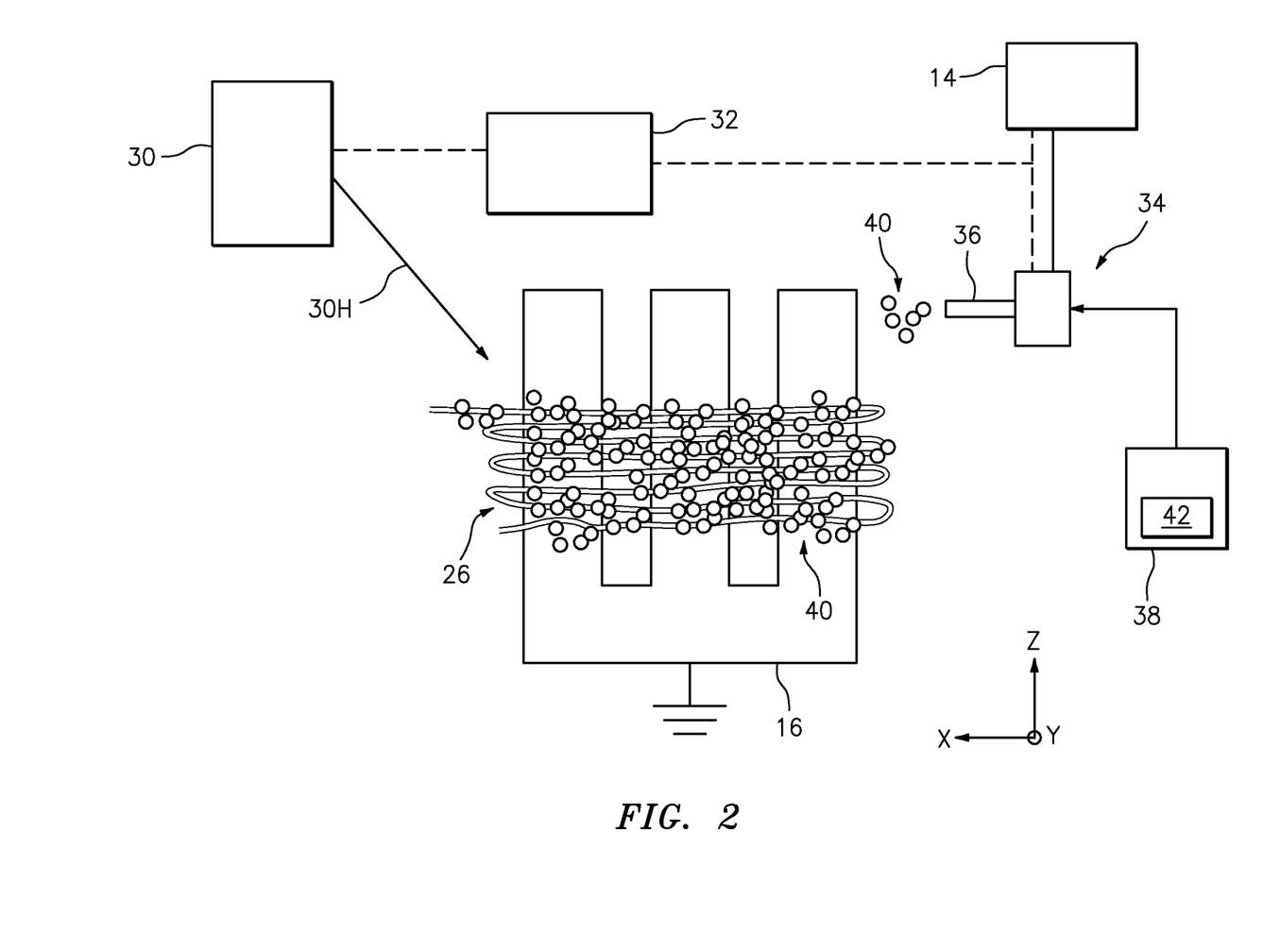
FIG. 2 illustrates an exemplary embodiment of an electrospraying apparatus.

Referring to FIG. 2, an electrospraying apparatus 34 for forming a three-dimensional ceramic-matrix composite structure, according to at least one embodiment of the present disclosure, is generally illustrated. The electrospraying apparatus 34 may be constructed similarly to the electrospinning apparatus 10. The electrospraying apparatus 34 includes a nozzle 36 in communication with a reservoir 38 containing a fluid 40 including a polymeric precursor 42 (e.g., the fluid 40 may be a homogenous solution or a colloidal dispersion including the polymeric precursor 42). In some embodiments, the electrospraying apparatus 34 may include a pump (not shown), similar to the pump 22, in fluid communication between the nozzle 36 and the reservoir 38. The power source 14 applies a direct current (DC) voltage to the nozzle 36 thereby biasing the nozzle 36 to a third DC voltage, different than the second DC voltage of the collector 16. The nozzle 36 is disposed in proximity to the collector 16 such that the electrospraying apparatus 34 can dispense the fluid 40 onto the surfaces of the collector 16 or the plurality of nanofibers 26 disposed on the collector 16. In some embodiments, the fluid 40 may be in the form of, for example, a gas or a plurality of droplets containing the polymeric precursor 42. In some embodiments the fluid 40 may be applied to the collector 16 and/or the plurality of nanofibers 26 by chemical vapor or atomic layer deposition process. In some embodiments, one or both of the collector 16 and the nozzle 36 may be configured to move relative to the other of the collector 16 and the nozzle 36 such that the nozzle 36 can apply the fluid 40 to the collector 16 from various angles. For example, the nozzle 36 may be configured to move in one or more of an x-, a y-, or a z-direction.

The third DC voltage of the nozzle 36 and the second DC voltage of the collector 16 create an electrical potential between the nozzle 36 and the collector 16. The fluid 40 may be atomized within the nozzle 36 and, as a result of the electrical potential, the fluid 40 may become charged causing the fluid 40 to repel from the nozzle 36 towards the collector 16. However, differences between the polymeric precursors 20, 42, for example, may cause the fluid 40 to form, for example, the plurality of droplets instead of nanofibers such as the plurality of nanofibers 26. Accordingly, in some embodiments, the polymeric precursor 20 may be different than the polymeric precursor 42. For example, in some embodiments, the polymeric precursor 20 may have a greater viscosity than the polymeric precursor 42.

In some embodiments, the electrospinning apparatus 10 and the electrospraying apparatus 34 may form one or more two-dimensional layers on the collector 16. For example, a two-dimensional layer may include the plurality of nanofibers 26 deposited on the collector 16 by the electrospinning apparatus 10 and the fluid 40 deposited on the collector 16 by the electrospraying apparatus 34. For example, the fluid 40 may be deposited on the collector 16 and/or the plurality of nanofibers 26 so as to at least partially fill the space between nanofibers of the plurality of nanofibers 26 of a single two-dimensional layer or of multiple two-dimensional layers. For example, application of the fluid 40 to the plurality of fibers 26 may form a matrix material around the plurality of nanofibers 26 which may provide oxidation resistance to the plurality of nanofibers 26 by limiting the rate at which oxygen can reach the plurality of nanofibers 26. Applying the fluid 40 to the plurality of nanofibers 26 may improve transfer efficiency, provide more consistent layer-to-layer quality, and/or reduce overspray (e.g., minimize waste of polymeric precursor 42 materials).

In some embodiments, a two-dimensional layer may include only the plurality of nanofibers 26 or may include varying quantities of both of the plurality of nanofibers 26 and the fluid 40. In some embodiments, a first two-dimensional layer may have of the plurality of nanofibers 26 and/or the fluid 40 which is different than a second two-dimensional layer.

As will be discussed in further detail, the polymeric precursors 20, 42 may include one or more quantities of resins or polymers, reactants, and/or solvents. In some embodiments, oxidation resistance of the final ultra-high temperature (UHT) composite structure may be improved by including an ultra-high temperature precursor material such as a refractory carbide or boride in one or both of the polymeric precursors 20, 42. Thus, the polymeric precursors 20, 42 or matrix materials may include one or more quantities of reactants which may form the ultra-high temperature (UHT) composite material following a pyrolysis step and/or a carbothermal or borothermal reduction step. For example, one or both of the polymeric precursors 20, 42 may include: a quantity of zirconium oxychloride, a quantity of boric acid to form zirconium diboride (ZrB$_2$), a quantity of polycarbosilane to form silicon carbide (SiC), a quantity of polysilazane, a quantity of tetrakis (diethylamido) hafnium, and a quantity of borane dimethyl sulfide to form SiHfBCN, a quantity of zirconium oxychloride octahydrate, a quantity of ethyl acetoacetate, and a quantity of boric acid to form zirconium diboride (ZrB2), a quantity of zirconium tetrakis (2,4-pentanedionate) to form zirconium carbide (ZrC), a quantity of polyzirconooxane to form zirconium carbide (ZrC), a quantity of hafnium chloride, a quantity of trimethylamine, a quantity of allyl acetonitrile, a quantity of ethylenediamine, and a quantity of allylamine to form hafnium carbide (HfC), a quantity of zirconium oxychloride octahydrate, a quantity of chitosan or phenolic resin, and a quantity of boric acid to form zirconium diboride (ZrB2), a quantity of hafnium oxychloride octahydrate, a quantity of chitosan or phenolic resin, and a quantity of boric acid to form hafnium diboride (HfB2), a quantity of zirconium oxychloride octahydrate, a quantity of hafnium oxychloride octahydrate, a quantity of chitosan or phenolic resin, and a quantity of boric acid to form Hf0.5Zr0.5B2, a quantity of dialkenyl substituted hafnocene monomers to form hafnium carbide, a quantity of hafnium chloride, a quantity of boric acid, and a quantity of acetylacetone to form hafnium diboride, a quantity of zirconium chloride, a quantity of hafnium chloride, a quantity of boric acid, and a quantity of acetylacetone to form Hf0.5Zr0.5B2, a quantity of polyzirconoxanesal, a quantity of phenylacetate-terminated polysilane, and a quantity of bisphenol-A typebenzoxazine to form zirconium carbide (ZrC)-silicon carbide (SiC), a quantity of bis(cyclopentadienyl) zirconium dihydride, a quantity of boran-dimethyl sulfide, and a quantity of vinyltrimethylsilane to form zirconium diboride, a quantity of polyzirconoxane and a quantity of polycarbosilane to form zirconium carbide (ZrC)-silicon carbide (SiC), a quantity of boron trichloride, a quantity of trichlorosilane, and a quantity of hexamethyldisilazane to form SiBN, a quantity of zirconium tetrachloride, a quantity of acetylacetone, a quantity of hydroquinone or [Zr(acac)2(C4H8O)2]n with polyborazine to form zirconium carbide (ZrC), zirconium diboride (ZrB2), and silicon carbide (SiC), or a quantity of hafnium tetrachloride, a quantity of boric acid, and a quantity of phenolic resin to form Hf0.5Zr0.5B2, or a quantity of HfC or ZrC powder in poly(methyl-silsesquioxane) assisted with a dispersant and cross-linking catalyst to form HfC or ZrC in a SiC matrix. In some embodiments, a mixture of multiple ultra-high temperature precursor materials in a polymeric precursor, such as polymeric precursor 20, 42, may be used for the synthesis of high-entropy, ultra-high temperature carbides or borides. For example, a polymeric precursor 20, 42, including Hf, Ta, Zr, and Nb may form (Hf—Ta—Zr—Nb)C.

In some embodiments, one or both of the polymeric precursors 20, 42 may be substantially free of oxygen. For example, one or both of the polymeric precursors 20, 42 may include quantities of trimethylamine, allylacetonitrile, hafnium chloride, ethylenediamine, and allylamine. In some embodiments, one or both of the polymeric precursors 20, 42 may include quantities of poly(dimethylsilane) or poly (dimethylcarbosilane) with bis(cyclopentadienyl) M dichloride Cp2MCl2 (M=Ti, Zr, Hf) to form group IV carbides. In some embodiments, one or both of the polymeric precursors 20, 42 may include quantities of bis(cyclopentadienyl)hafnium(IV) dichloride and (chloromethyl)trimethylsilane and trans-1,4-dibromo-2butene in the presence of Magnesium and tetrahydrofuran (THF) to form hafnium carbide. In some embodiments, one or both of the polymeric precursors 20, 42 may include quantities of allylhydrididopolycarbosilane (AHPCS), trimethylamine borane (TEAB), and bis(cyclopentadienyl)hafnium(IV) dichloride or bis(cyclopentadienyl)zirconium(IV) dichloride to form hafnium carbide or zirconium carbide, respectively. In some embodiments, one or both of the polymeric precursors 20, 42 may include quantities of metal particles, such as hafnium or zirconium, in the presence of polyhexenyldecaborane or in the presence of a solution of polyborazylene in dry glyme (ethylene glycol dimethyl ether) in order to form hafnium or zirconium carbide and borides. Polymeric precursors (e.g., polymeric precursors 20, 42) which are oxygen free may enable carbide or boride formation at much lower temperatures than from polymeric precursors which contain oxygen (e.g., alkoxides).

The polymeric precursors 20, 42 may include one or more thermoplastic resins or polymers. In some embodiments, the polymeric precursors 20, 42 may include one or more resins or polymers such as, but not limited to, polyacrylonitrile (PAN) resin, phenolic resin, polyvinylpyrrolidone, polyamide, poly(lactic-co-glycolic) acid, polycaprolactone, polypropylene, polivinylalcohol, and nylon-6. The polymeric precursor 20 may include one or more solvents such as, but not limited to, ethanol, xylene, N-dimethylformamide, N-methyl-2-pyrrolidone, N-dimethylacetamide, terahydrofuran, ethanol, 2,4, pentanedione, and water. In some embodiments, the polymeric precursor 20 includes different compounds, polymers, resins, solvents, and/or quantities of compounds, polymers, resins, and/or solvents with respect to the polymeric precursor 42.

Referring to FIGS. 1 and 2, in some embodiments, a rapid thermal processing assembly 30 may be configured to rapidly perform pyrolysis (e.g., in less than 5 minutes) and/or carbothermal/borothermal reduction of a single layer or of multiple layers of the plurality of nanofibers 26 and the plurality of particles 40 deposited on the collector 16. For example, the electrospinning assembly 10 and the electrospraying assembly 34 may deposit one or more layers on the collector 16, the rapid thermal processing assembly 30 may pyrolyze the one or more layers, and the electrospinning assembly 10 and the electrospraying assembly 34 may again deposit one or more layers on the collector 16 until formation of the green three-dimensional structure is substantially complete. By sequentially performing rapid thermal processing cycles and ceramic matrix material deposition cycles, the density of the final composite structure may be increased. In some other embodiments, the rapid thermal processing assembly 30 may include one or more thermal energy sources such as, but not limited to, lamps (e.g., xenon flash lamps, tungsten-halogen lamps, UV lamps, or IR transmitters), lasers, electron beams, infrared energy sources such as an infrared furnace, etc., configured to pyrolyze and/or carbothermally/borothermally reduce the one or more layers by applying a thermal energy 30H to the one or more layers. In some embodiments, the thermal energy 30H applied to the one or more layers may be controlled by a pyrometer or a thermocouple. In some embodiments, rapid thermal processing temperatures may be in the range of about 200° C. to about 1300° C. (about 392° F. to about 2372° F.) with a rate of temperature increase in the range of about 20° C. to about 200° C. (about 68° F. to about 392° F.). In some embodiments, the thermal energy sources of the rapid thermal processing assembly 30 may alternatively or additional be used to apply a thermal energy to a nozzle of the at least one spinneret 12 while the polymeric precursor 20 is being dispensed. As a result, for example, during melt electrospinning, the polymeric precursor 20 may be heated as it leaves the at least one spinneret 12 causing the resulting plurality of nanofibers 26 to remain molten for a greater duration of time, thereby permitting the formation of smaller diameter nanofibers.

Green nanofibers deposited on collector 16 may be poor conductors of electricity while the composite material formed on the collector 16 from the green nanofibers (e.g., following pyrolysis and carbothermal/borothermal reduction) may have substantially improved electrical conduction properties. As a result, the composite material may provide an improved electrical conducting path between the exterior surface of the material disposed on the collector 16 (which may be green nanofibers or composite material) and the collector 16 itself. Without a sufficient electrical conducting path, the green nanofibers deposited on the collector 16 may cause an electrical charge to build up causing the electrical potential between the at least one spinneret 12 and the exterior of the material deposited on the collector 16 to decrease. As a result, nanofibers formed by the at least one spinneret 12 may be repelled from the collector 16. Accordingly, one or more embodiments of the present disclosure may permit improved formation of composite structures by providing a sufficient conducting path between the formed nanofibers and the composite structure and to provide continuous deposition of nanofibers on the collector 16.

At least one controller 32 may be configured to permit an operator to control operation of at least one of the electrospinning apparatus 10 and the electrospraying apparatus 34. The at least one controller 32 may be in communication (e.g., signal communication) with one or more of the at least one spinneret 12, the power source 14, the reservoir 18, the pump 22, the plurality of magnets 28, the rapid thermal processing assembly 30, the nozzle 36, the reservoir 38, and other aspects of the electrospinning apparatus 10 and/or the electrospraying apparatus 34. The at least one controller 32 may include any type of computing device, computational circuit, or any type of process or processing circuit capable of executing a series of instructions that are stored in memory. The controller 32 may include multiple processors and/or multicore CPUs and may include any type of processor, such as a microprocessor, digital signal processor, co-processors, a micro-controller, a microcomputer, a central processing unit, a field programmable gate array, a programmable logic device, a state machine, logic circuitry, analog circuitry, digital circuitry, etc., and any combination thereof. The instructions stored in memory may represent one or more algorithms for controlling one or more structures of the electrospinning apparatus 10 and/or the electrospraying apparatus 34, and the stored instructions are not limited to any particular form (e.g., program files, system data, buffers, drivers, utilities, system programs, etc.) provided they can be executed by the at least one controller 32. The memory may be a non-transitory computer readable storage medium configured to store instructions that when executed by one or more processors, cause the one or more processors to perform or cause the performance of certain functions. The memory may be a single memory device or a plurality of memory devices. A memory device may include a storage area network, network attached storage, as well a disk drive, a read-only memory, random access memory, volatile memory, non-volatile memory, static memory, dynamic memory, flash memory, cache memory, and/or any device that stores digital information. One skilled in the art will appreciate, based on a review of this disclosure, that the implementation of the at least one controller 32 may be achieved via the use of hardware, software, firmware, or any combination thereof. The at least one controller 32 may also include input (e.g., a keyboard, a touch screen, etc.) and output devices (a monitor, sensor readouts, data ports, etc.) that enable the operator to input instructions, receive data, etc.

Figure 3:
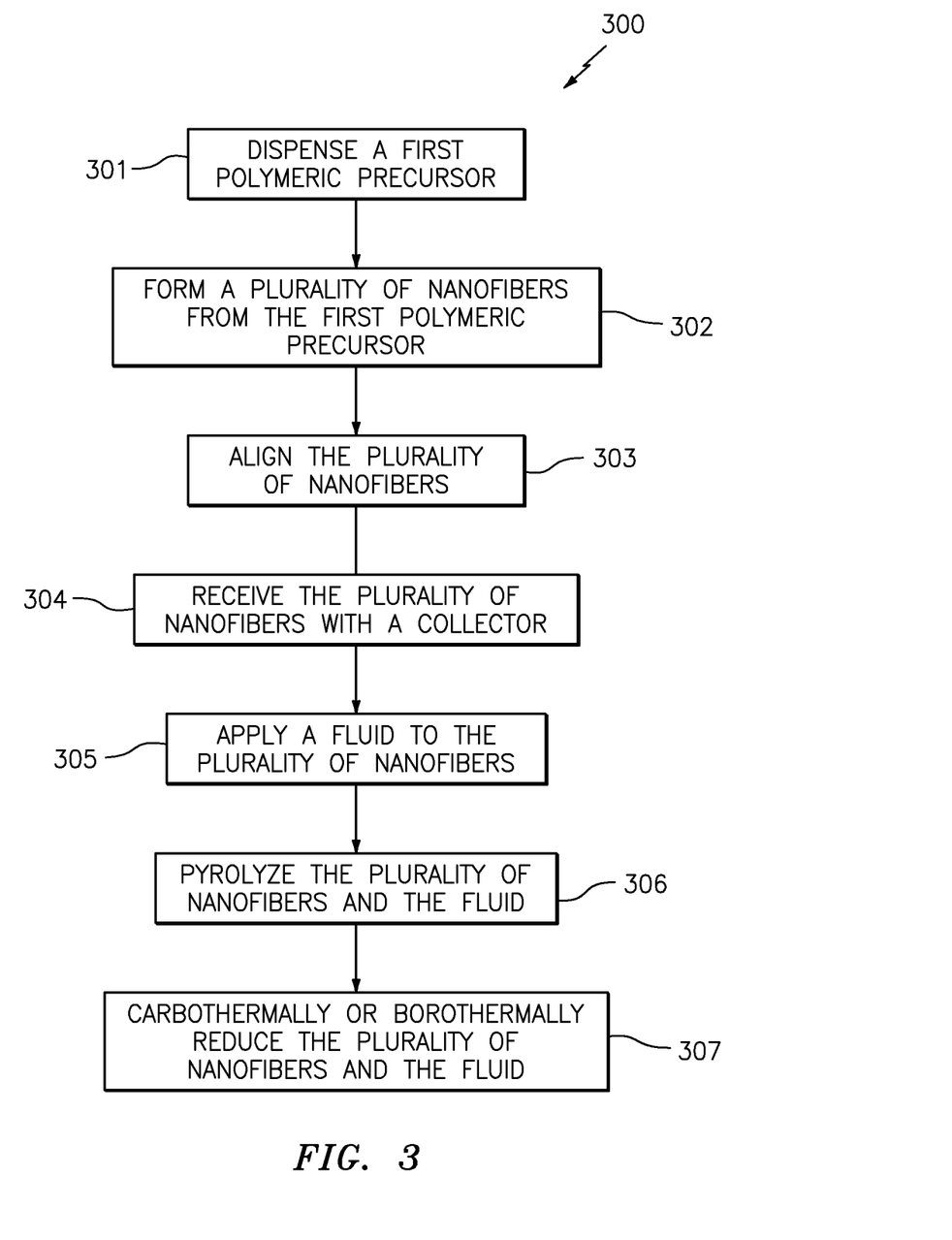
FIG. 3 is a flowchart depicting a method for composite structure.

Referring to FIG. 3, a method 300 for forming a three-dimensional composite structure according to one or more embodiments of the present disclose is provided. In step 301, the polymeric precursor 20 is dispensed with the at least one spinneret 12 into the flowpath 24. In step 302, the plurality of nanofibers 26 are formed by whipping action of the polymeric precursor 20 as it moves along the flowpath 24 from the at least one spinneret 12 to the collector 16. In step 303, the direction of movement of the plurality of nanofibers 26 along the flowpath 24 is changed by adjusting the magnetic field of the plurality of magnets 28 in order to align the plurality of nanofibers 26 on the collector 16. In step 304, the plurality of nanofibers 26 are received by the collector 16.

In step 305, the electrospraying apparatus 34 applies the fluid 40 to the plurality of nanofibers 26 disposed on the collector 16. The plurality of particles 40 may be applied to one two-dimensional layer of the plurality of nanofibers 26 or multiple two-dimensional layers of the plurality of nanofibers 26. In step 306, the plurality of nanofibers 26 and the fluid 40 may undergo pyrolysis of the one or more two-dimensional layers. In some embodiments, the pyrolysis step may apply a thermal energy 30H up to about 850° C. (1562° F.) to the plurality of nanofibers 26 disposed on the collector 16. In step 307, the plurality of nanofibers 26 is carbothermally or borothermally reduced. In some embodiments, the temperature range of the carbothermal or borothermal reduction for the plurality of nanofibers 26 disposed on the collector 16 may be in the range of about 1200° C. to about 2000° C. (about 2192° F. to about 3632° F.). In some other embodiments, the temperature range of carbothermal or borothermal reduction for the plurality of nanofibers 26 disposed on the collector 16 may be in the range of about 1200° C. to about 1600° C. (about 2192° F. to about 2912° F.). The polymeric precursor 42 of the fluid 40 may shrink as a result of pyrolysis and carbothermal/borothermal reduction, thereby forming voids. Accordingly, in some embodiments, the sequence of steps 305 to 307 may be repeated as necessary to fill voids in the three-dimensional composite structure prior to depositing an additional layer of nanofibers 26.

By applying the fluid 40 to the plurality of nanofibers 26 on a layer-by-layer or multi-layer-by-multi-layer basis, the porosity of the three-dimensional composite structure may be substantially reduced thereby increasing density of the composite structure. Application of the fluid 40 to the plurality of nanofibers 26 may substantially prevent the need for subsequent infiltration processing (e.g., polymer infiltration and pyrolysis (PIP)) of the ceramic matrix material (e.g., the plurality of nanofibers 26 and the fluid 40), which infiltration processing might otherwise leave porosity in internal portions of the composite structure. In some embodiments, however, an infiltration step may additionally be included if a sufficient density of the composite structure has not been achieved, for example, due to shrinkage of the plurality of nanofibers 26 and/or the fluid 40 during pyrolysis and/or carbothermal or borothermal reduction. Infiltration of the composite structure with a matrix material may be accomplished by any infiltration method conventionally known in the art (e.g., chemical vapor deposition).

In some embodiments, the three-dimensional composite structure may have a graded structure wherein the ceramic matrix composite (CMC) material may exhibit a gradual change in one or more characteristics from one portion of the graded structure to another portion of the graded structure. In some embodiments, the graded structure may have a first porosity in a first portion of the graded structure (e.g., an innermost portion or layer of the graded structure) and a second porosity, different than the first porosity in a second portion of the graded structure (e.g., an outermost portion or layer of the graded structure). In some embodiments, a first ratio of the nanofibers 26 formed from the polymeric precursor 20 to the matrix material formed from the polymeric precursor 42 at a first portion of the graded structure may be different than a second ratio of the nanofibers 26 to the matrix material at a second portion of the graded structure. In some embodiments, a composition of the nanofibers 26/matrix material at a first portion of the graded structure may be different than a composition of the nanofibers 26/matrix material at a second portion of the graded structure. The three-dimensional composite structure having a graded structure may be less susceptible to thermo-mechanical stress due to a thermal expansion coefficient mismatch. In some embodiments, the graded structure may provide improved mechanical properties in one portion of the three-dimensional composite structure while providing improved ablation properties in another portion of the three-dimensional composite structure. In some embodiments, the graded structure may provide improved oxidation and/or steam resistance in one portion of the three-dimensional composite structure than in another portion of the three-dimensional composite structure.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. Accordingly, the present disclosure is not to be restricted except in light of the attached claims and their equivalents.

What is claimed is:

1. A method for forming an ultra-high temperature (UHT) composite structure, the method comprising:
   dispensing a first polymeric precursor with a spinneret;
   forming a first plurality of nanofibers from the first polymeric precursor;
   depositing the first plurality of nanofibers on a collector;
   applying a fluid, with a nozzle, onto the first plurality of nanofibers disposed on the collector, the fluid comprising a second polymeric precursor, the first plurality of nanofibers and the fluid defining a two-dimensional layer;
   pyrolyzing the two-dimensional layer with a rapid thermal processing assembly; and
   forming a second plurality of nanofibers from the first polymeric precursor and depositing the second plurality of nanofibers on the two-dimensional layer subsequent to pyrolyzing the two-dimensional layer.

2. The method of claim 1, wherein forming and depositing the second plurality of nanofibers occurs subsequent to applying the fluid onto the first plurality of nanofibers.

3. The method of claim 1, further comprising one of carbothermally or borothermally reducing the two-dimensional layer.

4. The method of claim 1, further comprising moving the nozzle relative to the collector.

5. The method of claim 1, wherein the first polymeric precursor is different than the second polymeric precursor.

6. The method of claim 5, wherein the first polymeric precursor has a greater viscosity than the second polymeric precursor.

7. A method for forming an ultra-high temperature (UHT) composite structure, the method comprising:
   sequentially forming a plurality of two-dimensional layers on a collector biased at a collector DC voltage including, for each sequentially-formed two-dimensional layer of the plurality of two-dimensional layers,
   dispensing a first polymeric precursor with a spinneret biased at a first DC voltage different than the collector DC voltage, forming a plurality of nanofibers from the first polymeric precursor, and depositing the plurality of nanofibers on the collector; and
   dispensing a fluid with an electrospraying apparatus biased at a second DC voltage different than the collector DC voltage and depositing the fluid on the plurality of nanofibers deposited on the collector, the fluid including a second polymeric precursor;
   wherein the step of sequentially forming the plurality of two-dimensional layers further includes, for each sequentially-formed two-dimensional layer, pyrolyzing the sequentially-formed two-dimensional layer, including the deposited plurality of nanofibers and the deposited fluid, with a rapid thermal processing assembly.

8. The method of claim 7, wherein the ultra-high temperature (UHT) composite structure is a graded structure.

9. The method of claim 8, wherein the plurality of two-dimensional layers includes a first two-dimensional layer and a second two-dimensional layer, the method further comprising changing a ratio of the plurality of nanofibers formed from the first polymeric precursor to a matrix material formed from the second polymeric precursor for the second two-dimensional layer relative to the first two-dimensional layer.

10. The method of claim 7, wherein the first polymeric precursor is different than the second polymeric precursor.

11. The method of claim 10, wherein the first polymeric precursor has a greater viscosity than the second polymeric precursor.

12. The method of claim 7, wherein the rapid thermal processing assembly includes at least one of a laser, an electron beam, or a flash pyrolysis assembly.

13. The method of claim 7, wherein pyrolyzing the sequentially-formed two-dimensional layer includes carbothermally or borothermally reducing the sequentially-formed two-dimensional layer.

14. The method of claim 7, wherein the plurality of two-dimensional layers includes a first two-dimensional layer and a second two-dimensional layer, the method further comprising additionally dispensing the second polymeric precursor with the electrospraying apparatus after pyrolyzing the first two-dimensional layer and before forming the second two-dimensional layer of the forming a plurality of two-dimensional layers.

* * * * *